N. M. HANSEN.
SCALE.
APPLICATION FILED NOV. 21, 1905.

1,005,202.

Patented Oct. 10, 1911.

3 SHEETS—SHEET 1.

Fig 1.

Witnesses
Edw. P. Barritt
Louis B. Erwin

Inventor
Niels M. Hansen
By Rector & Hibben
His Atty's

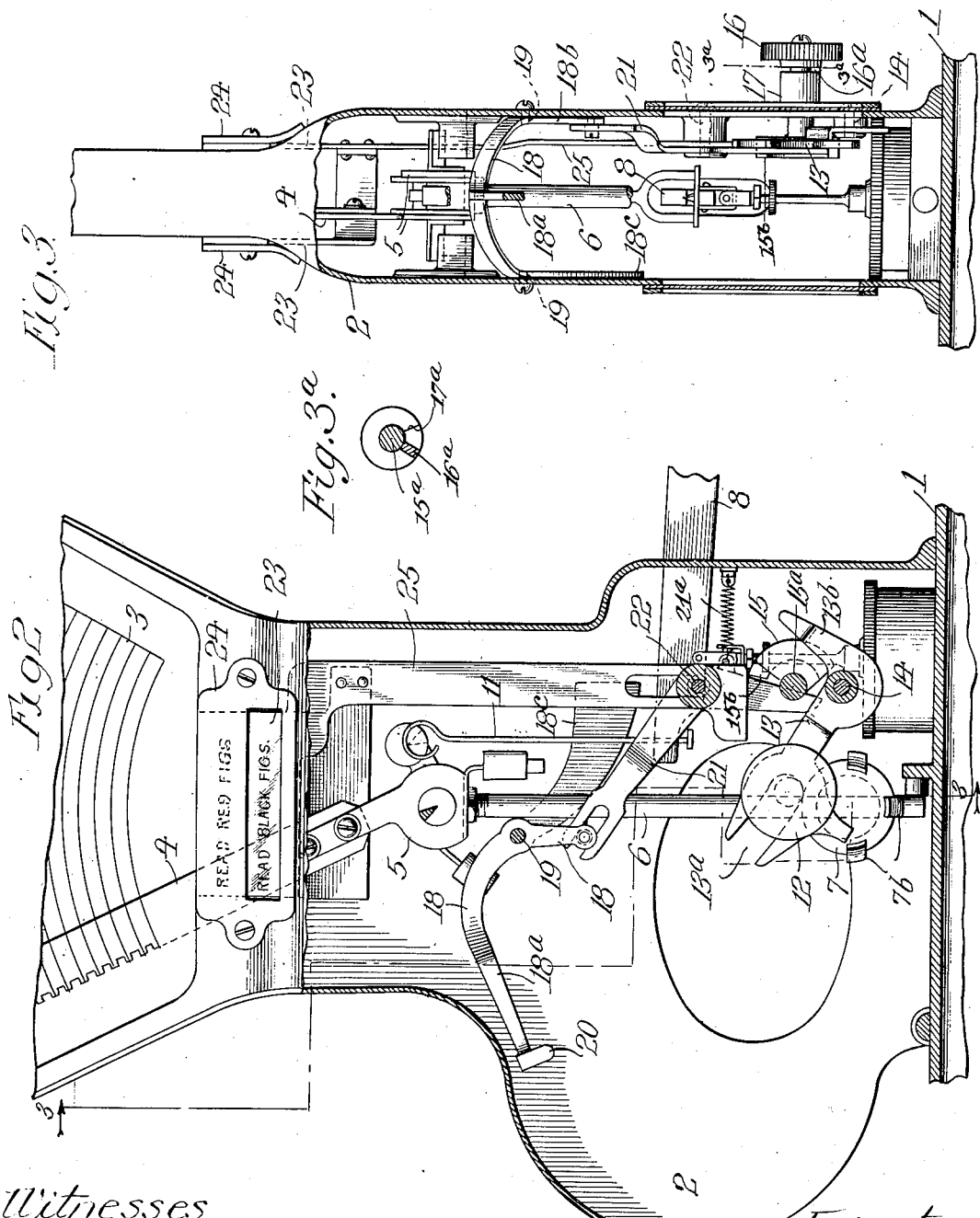

N. M. HANSEN.
SCALE.
APPLICATION FILED NOV. 21, 1905.
1,005,202.
Patented Oct. 10, 1911.
3 SHEETS—SHEET 3.
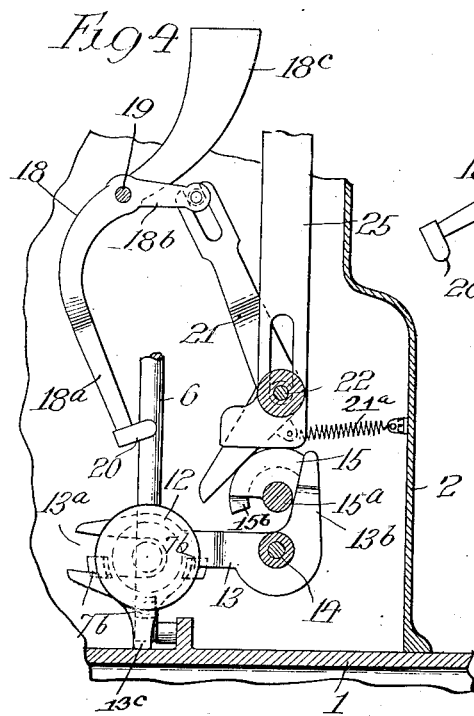
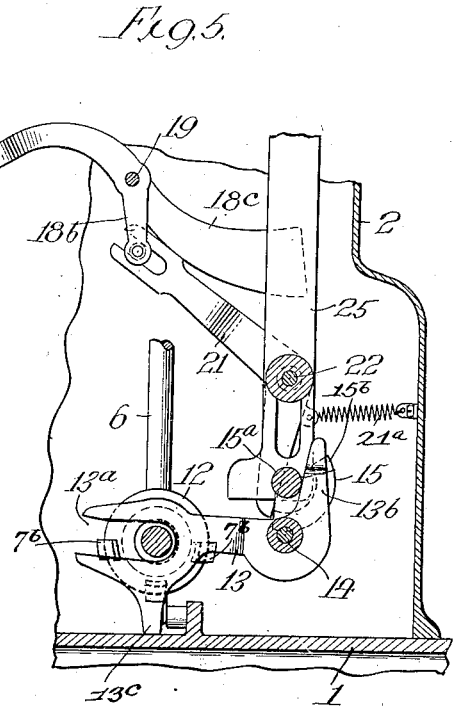
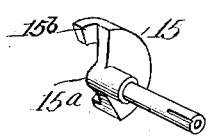
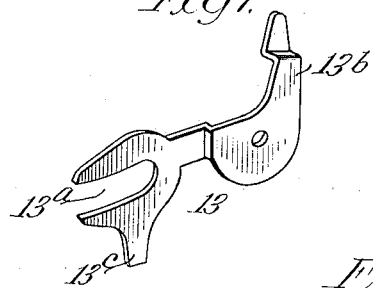
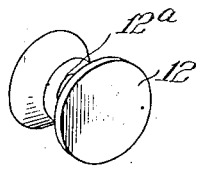
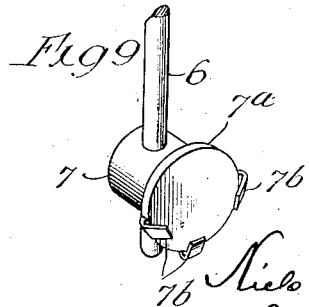
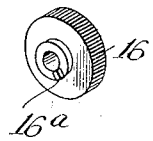
Witnesses
Edw. P. Barrett
Louis B. Erwin
Inventor
Niels M. Hansen
By Rector & Hibben
his Atty's

UNITED STATES PATENT OFFICE.

NIELS M. HANSEN, OF TOLEDO, OHIO, ASSIGNOR TO TOLEDO COMPUTING SCALE COMPANY, OF TOLEDO, OHIO, A CORPORATION OF NEW JERSEY.

SCALE.

1,005,202.  Specification of Letters Patent.  Patented Oct. 10, 1911.

Application filed November 21, 1905. Serial No. 288,345.

*To all whom it may concern:*

Be it known that I, NIELS M. HANSEN, a citizen of the United States, residing at Toledo, Lucas county, Ohio, have invented certain new and useful Improvements in Scales, of which the following is a specification.

My invention relates to that class of automatic scale commonly known as a computing scale by which are indicated both the weight and the value of an article at any given price per unit of weight and such invention pertains more particularly to the pendulum type of computing scale.

The object of my invention is to provide novel and efficient mechanism arranged to coöperate with a removable pendulum weight which is provided in addition to the usual fixed pendulum weight whereby such weight may, at the will of the operator, be placed or deposited upon the pendulum to act in conjunction therewith for the purpose of increasing the weighing capacity and price computing range of the scale and also to withdraw or remove such removable pendulum weight for the purpose of permitting the scale to operate according to its normal capacity. In the present instance I also provide novel and efficient means, operated by the same medium which operates the mechanism controlling the removable pendulum weight, for indicating to the operator the fact whether the removable weight is in operative or inoperative condition, that is, whether the removable weight is on or off the pendulum, and also what particular weight and price figures are to be read, whether the red or black ones, according to the selected distinguishing colors adopted, it being understood that one set of figures are to be read when the scale is working at its normal capacity and that the other set of figures are to be read when the capacity of the scale is increased by placing the removable weight, sometimes called a ball, upon the pendulum.

In the drawings Figure 1 is a side elevation of a computing scale embodying my invention; Fig. 2 a sectional elevation of the lower portion of the housing showing the working parts therein in elevation; Fig. 3 a sectional elevation on the line 3—3 of Fig. 2; Fig. 3ª a sectional detail on line 3ª—3ª of Fig. 3; Figs. 4 and 5 detailed views showing the relative positions of certain of the parts under different conditions; Fig. 6 a perspective of the operating cam; Fig. 7 a perspective of the bell crank or rock arm which engages the removable weight; Fig. 8 a perspective of such removable weight; Fig. 9 a perspective of the fixed weight and a portion of the pendulum rod; and Fig. 10 a detailed view illustrating the means for limiting the oscillation of the cam.

Inasmuch as my invention represents an improvement upon the scale described and claimed in De Vilbiss Reissue Patent No. 12,029 dated September 9, 1902, the details of the construction common to the patented scale and my improved scale need be described only in a general way, reference being had to said patent for a detailed description of such common structure. As in said prior scale, my improved scale comprises a base 1 on which is mounted a housing 2 arranged to carry the usual price computing chart 3 having a plurality of curved rows of price totals (not shown) and also having a plurality of rows of figures indicating weights, of which the numbers or figures in one row are multiples of those in the other. An indicator 4 which is operatively connected with the scale lever and pendulum is arranged to move or sweep over the face of this chart and to thereby indicate in connection therewith both the weight and the value of the article or load on the platform, according to any given price per pound or other unit of weight. The lower end of the indicator 4 is connected with the pendulum which comprises the head or disk 5 suitably pivoted within the housing, a pendulum rod 6 and a fixed or permanent weight 7 at its lower end. The base 1 also supports the bearings for the scale beam or lever 8 on which the usual platform 9, which may have a pan 10, is pivotally mounted. The inner end of the scale lever is operatively connected with the upper end of the pendulum by an operating connection such as the link 11.

The arrangement and purpose of the two different sets of weight figures on the chart and the different sets of figures representing prices per pound or other unit of weight and appearing on the indicator, are now well known in the art and are also fully described in the aforesaid De Vilbiss patent. Consequently no detailed description thereof is necessary.

In the present instance the fixed pendulum weight 7 is made somewhat different from the ordinary weight or ball inasmuch as such weight is designed to receive and retain the removable or supplemental weight when the same has been deposited upon it. For this purpose one side of the fixed weight is made in the form of a disk 7ª having fingers 7ᵇ projecting from its periphery and bent or curved inwardly over the face of the disk, said fingers forming retaining devices for the removable weight marked 12 which is illustrated in perspective in Fig. 8. This removable weight comprises two heads connected by a stem 12ª, the inner head being substantially a truncated cone which fits securely within the socket formed on the fixed weight by means of the retaining fingers 7ᵇ, the latter being confined to the lower half of the disk 7ª so that the supplemental weight can be readily raised out of the socket. It will be understood that the removable or supplemental weight is applied to the pendulum for the purpose of increasing the resistance offered to the movement of the indicator with the result that the capacity of the scale is increased according to the weight of the removable weight. According to the present and illustrated construction the weight is such as to double the resistance of the pendulum and thereby double the capacity of the scale, for which reason in the chart in Fig. 1 the weight figures in the outer row which in practice are the red weight figures, are double those of the inner row which in present practice are printed in black. In the illustrated scale the normal capacity is ten pounds which is increased to twenty pounds with the use of the removable weight.

The mechanism for depositing or placing the removable weight upon the pendulum and removing it therefrom at the will of the operator comprises a rock arm or bell crank 13 pivoted on the axis 14 within the housing. This rock arm is positioned at one side of the pendulum and in a plane parallel to the plane of oscillation thereof. One end of the rock arm is bifurcated or provided with a slot 13ª open at that end toward the side or end of the scale in which such oscillation takes place. This rock arm is adapted to coöperate with the removable weight and its slot is arranged to receive the stem 12ª of such removable weight, the slot being made of greater width than the diameter of such stem to permit of some play between these parts for a purpose hereinafter made apparent. In one position, that is when its slot is at an angle as shown in Fig. 1, the removable weight is held suspended in an inoperative position and out of the range of the fixed weight and its retaining fingers. When, however, this rock arm is in the position indicated in Figs. 4 and 5, that is with the slot in a horizontal position, the removable weight has been deposited in place upon the pendulum and retained by the retaining fingers so as to act in conjunction with the regular fixed weight. In this latter position, the slot of the rock arm is in such position that the removable weight oscillates without any interference, the stem 12ª of such removable weight moving freely in the slot 13ª. By rocking the arm 13 upwardly in a clock-wise direction the removable weight will be removed from the pendulum whereupon the scale will operate according to its normal capacity.

For operating the arm 13 I provide a cam 15 of substantially segmental form and arranged to serve as the one operating means for the indicator which indicates to the operator whether the removable weight is on or off the pendulum and also operate the mechanism, hereinafter described, for automatically bringing the pendulum to a substantially vertical position when it is desired to deposit or remove the removable weight. This cam is arranged to bear against the inner edge of the upwardly extending off-set portion or arm 13ᵇ of the arm or bell crank 13. When the cam is in the position indicated in Fig. 4 the removable weight is in its operative position, that is deposited upon the pendulum, at which time a substantially radial edge of the cam bears against the off-set shoulder of the arm 13ᵇ. When, however, the cam 15 is moved in a clock-wise direction the arm 13 is quickly raised and such movement continues until the curved surface of the cam bears against such shoulder of arm 13ᵇ and retains the latter in such elevated position without moving it farther. Suitable means are provided for limiting the downward movement of the rock arm or bell crank and in the present instance such means consists of a depending finger 13ᶜ on such arm or bell crank and adapted to strike upon the base of the scale.

For the purpose of operating the cam 15 I secure upon the shaft 15ª, to which the cam is secured and which extends extraneous of the housing, a hand wheel or knurled knob 16 having a pin 16ª arranged to travel between stop shoulders 17ª formed in a projection or bearing 17 of the shaft 15ª. The extremes of the rocking movements of the rock arm or bell crank 13 are thus determined.

As hereinbefore stated, I provide mechanism for bringing the pendulum to a vertical position when it is desired to deposit or remove the removable weight and in the present instance such mechanism comprises a yoke or frame 18 pivoted within the housing upon a cross-rod 19 and terminated at its lower or free end in an arm 18ª which at the extreme end is provided with a curved plate 20. This arm is arranged to oscillate in the plane of oscillation of the pendulum rod 6 but in the normal position of the yoke or frame as indicated in Fig. 5, such arm is so removed or elevated as to be beyond the range of movement of such pendulum rod but in the operation of depositing the removable weight upon the pendulum such yoke or frame is automatically operated by oscillation downwardly to the position indicated in Fig. 4, forcing the pendulum rod to a vertical position in case there is any load on the platform. The automatic means for operating such yoke or frame comprises a bell crank 21 whose upwardly extending end is slotted and operatively connected with the arm 18$^b$ of the yoke or frame 18 and whose downwardly extending arm is connected by a spring 21$^a$ with the casing. This bell crank 21 is pivoted upon a shoulder screw 22 mounted in the housing. The lower end of the bell crank is arranged in proximity to an inner flange-form portion 15$^b$ of the cam 15 and is operated thereby with the result that when the cam is operated for rocking the arm or bell crank 13, the yoke or frame 18 is rocked or oscillated. Normally the lower end of the bell crank 21 bears against a substantially radial end of the cam flange but when such cam is operated a comparatively rapid initial movement is imparted to the bell crank 21 and a slower movement thereafter as the arm 18$^a$ approaches its limit of down movement. The yoke or frame 18 is preferably provided with a counterbalancing extension 18$^c$.

The indicator for indicating to the salesman and also the customer which figures are to be read whether the black or the red in case such contrasting colors are the ones adopted, comprises in the present instance a pair of vertically movable plates 23 passing through slots at the upper end of the larger portion of the housing and arranged to slide adjacent the outer surface of the upper or reduced portion of the housing, such plates by preference being provided with guides 24 secured to the outer sides or faces of such housing as clearly indicated in Figs. 2 and 3. The lower or inner ends of these indicating plates are secured together so as to move in unison and the same are provided with an operating connection comprising in the present instance a depending plate or strip 25 slotted near its lower end to permit the shouldered screw 22 to pass therethrough, thereby guiding the lower end of such strip. The lower end or foot of this strip coöperates with the cam flange in such manner that in one position of such cam the indicator plates are held elevated so that the proper sign or indication on these plates such as "Read black figures" is exposed to the view of the salesman and the customer whereas when the cam is in another position the plates are permitted to fall by their gravity so as to conceal said indication and to thereupon expose another indication such as "Read red figures" which may be indicated directly upon the outer sides of the housing and exposed only when the indicator plates are lowered. It will be understood from an examination of Figs. 2, 4 and 5 more particularly that when the removable ball is in inoperative position, the indicator plates are held up by the cam so as to indicate "Read black figures" but that after the cam has been rotated in an anti-clock-wise direction and after the removable weight has been deposited upon the pendulum and the arm 18$^a$ removed to a non-interfering position by the action of gravity and the spring 21$^a$, the indicator plates are permitted to drop as shown in Fig. 5.

The arrangement and construction are such that the scale is locked by the action of the arm 18$^a$ upon the pendulum until the operation of depositing the removable weight upon the pendulum has been fully accomplished and the same is true as to the operation of removing such weight. In other words the arm 18$^a$ operates in advance of the arm or bell crank 13 to bring the pendulum to a vertical position if it happens to be at an angle at that time and to retain it in such vertical position, and that such arm or pendulum restoring device, is not moved from operative position until after the removable weight has been actually deposited or fully removed from the pendulum. In further explanation of this timing in the action of the parts it should be stated that the body of the cam 15 is substantially quadrantal and the flange 15$^b$ projects somewhat beyond the same at the end. When the cam is turned to the left from the position shown in Fig. 2 this projecting portion of the cam, which is then supporting the strip or plate 25, first acts with its end against the lower arm of the bell-crank lever 21, rocking the latter in the manner described so as to insure the proper positioning of the pendulum. Then as the cam continues to turn and the bell-crank lever and strip 25 are riding upon the periphery of the flange 15$^b$,—the position of said strip 25 and consequently the indicator plates 23 remaining unchanged, i. e. still exhibiting the legend "Read black figs.",—the right-hand radial edge of the body portion of the cam passes the offset-shoulder of the arm 13$^b$, whereupon the supplemental pendulum weight drops into the socket of the permanent weight as illustrated in Fig. 4. The continued turning of the cam from right to left thereafter causes the end of the cam flange coincident with said right-hand radial edge (which now becomes the left-hand edge) to retreat from the foot of the strip 25 and from the depending arm of the bell-crank 21, whereupon the latter is returned to normal position by counterbalance 18ᶜ and spring 21ᵃ, and the strip 25 and plates 23 drop to expose the legend "Read red figs.", the flange formation of the cam permitting said strip to pass down behind the body of the cam and the end of its shaft 15ᵃ as shown in Fig. 5. The depending arm of the bell-crank 21 also moves slightly across the inner end of this shaft. In the return movement when the cam is carried from left to right that end of its flange which is coincident with the then left-hand radial edge of the cam-body first acts upon the depending arm of the bell-crank 21 and then upon the foot of the strip 25. The bell-crank having been thus displaced and the strip and indicator plates elevated, said arm and strip ride upon the periphery of the cam flange as illustrated in Fig. 4. Then the said radial edge of the cam body acts against the offset-shoulder of the arm 13ᵇ to lift or raise the supplemental weight to the position shown in Fig. 2, said offset portion thereafter riding upon the periphery of the cam-body as there illustrated while the cam-flange retreats from the depending arm of the bell-crank 21 to permit the pendulum holding yoke 18 to return to normal elevated position.

I claim:

1. In a pendulum scale, in combination with the pendulum thereof, a removable weight arranged to coöperate with the pendulum, and mechanism for placing such weight on the pendulum and removing it therefrom comprising an arm arranged at one side of the plane of oscillation of the pendulum and in the path of the removable weight to engage the latter, and means for operating said arm at the will of the operator.

2. In a pendulum scale, in combination with the pendulum thereof, a removable weight arranged to coöperate with the pendulum, and mechanism for placing such weight on the pendulum and removing it therefrom comprising a bifurcated arm arranged in the path of the removable weight to engage the latter, and means for operating said arm at the will of the operator.

3. In a pendulum scale, in combination with the pendulum thereof, a removable weight arranged to coöperate with the pendulum, and mechanism for placing such weight on the pendulum and removing it therefrom comprising a bell crank, one arm of which is bifurcated to coöperate with the removable weight, and means coöperating with the other arm to rock the bell crank.

4. In a pendulum scale, in combination with the pendulum thereof, a removable weight arranged to coöperate with the pendulum and located laterally thereof when in coöperating position, and mechanism for placing such weight on the pendulum and removing it therefrom comprising a rocking member arranged laterally of the plane of oscillation of the pendulum and in the path of the removable weight, and means for operating said member.

5. In a pendulum scale, in combination with the pendulum thereof, a removable weight arranged to coöperate with the pendulum and located laterally thereof when in coöperating position, said removable weight having a reduced or stem portion intermediate its length, and mechanism for placing such weight on the pendulum and removing it therefrom comprising a bifurcated arm arranged to be rocked and to engage said stem portion of the removable weight, and means for rocking the arm at the will of the operator.

6. In a pendulum scale, the combination with the pendulum and the usual pendulum weight thereof, of a removable weight arranged to be attached to the pendulum laterally thereof, and mechanism for placing such weight on the pendulum and removing it therefrom comprising a rocking member arranged laterally of the plane of oscillation of the pendulum weight, and adapted to engage the removable weight for placing the latter upon and removing it from the pendulum weight, and means for operating said member.

7. In a pendulum scale, the combination with the pendulum and the usual pendulum weight thereof having at one side means for receiving and retaining the removable weight, of a removable weight arranged to be attached laterally of the pendulum weight by said means, and a rocking member adapted to engage the removable weight and arranged to remove it from and to place it upon the pendulum weight, and means for operating said member.

8. In a pendulum scale, the combination of a pendulum having a pendulum weight provided with a lateral socket to receive the removable weight from above, a removable weight adapted to be received by said socket, and mechanism for placing the removable weight in the socket of the pendulum weight and removing it therefrom.

9. In a pendulum scale, the combination of a pendulum having a pendulum weight provided with laterally extending fingers, a removable weight adapted to be received by said fingers and thereby held upon the pendulum weight, and mechanism for placing the removable weight on the pendulum weight and removing it therefrom.

10. In a pendulum scale, the combination of a pendulum having a pendulum weight provided with laterally extending fingers, said fingers being upwardly and inwardly turned to form a socket, a removable weight adapted to be received by said fingers and thereby held upon the pendulum weight, and mechanism for placing the removable weight on the pendulum weight and removing it therefrom.

11. In a pendulum scale, the combination of a pendulum having a pendulum weight provided with a lateral socket to receive the removable weight from above, said socket being substantially truncated conical in form, a removable weight having a corresponding truncated conical portion to fit in said socket, and mechanism for placing the removable weight in the socket and removing it therefrom.

12. In a pendulum scale, the combination of a pendulum having a pendulum weight provided with a lateral socket to receive the removable weight from above, a removable weight consisting of two heads with a connecting stem, one of the heads being arranged to be received by the socket, and mechanism for placing the removable weight in the socket and removing it therefrom.

13. In a pendulum scale, the combination of a pendulum having a pendulum weight provided with a lateral socket to receive the removable weight from above, said socket being substantially truncated conical in form, a removable weight consisting of two heads with a connecting stem one of which is correspondingly truncated conical to fit in said socket, and mechanism for placing the removable weight in the socket and removing it therefrom.

14. In a pendulum scale, the combination of a pendulum having a pendulum weight provided with a lateral socket to receive the removable weight from above, a removable weight consisting of two heads with a connecting stem, one of the heads being arranged to be received by the socket, a bifurcated arm arranged to rock and adapted to engage the stem of the removable weight, and means for rocking the arm at the will of the operator.

15. In a pendulum scale, in combination with the pendulum thereof, a removable weight arranged to coöperate with the pendulum, and mechanism for placing such weight on the pendulum and removing it therefrom comprising a rock arm arranged at one side of the plane of oscillation of the pendulum and in the path of the removable weight, and means for limiting the downward rocking of such arm.

16. In a pendulum scale, in combination with the pendulum thereof, a removable weight arranged to coöperate with the pendulum, and mechanism for placing such weight on the pendulum and removing it therefrom comprising a rock arm arranged at one side of the plane of oscillation of the pendulum and in the path of the removable weight, and a projection on said arm arranged to strike a fixed part of the scale to limit the downward rocking thereof.

17. In a pendulum scale, the combination of a pendulum having a pendulum weight provided with a lateral socket to receive the removable weight from above, a removable weight consisting of two heads with a connecting stem, one of the heads being arranged to be received by the socket, an arm having an open ended slot to engage the stem of the removable weight which is adapted to have play in such slot, and means for rocking the arm at the will of the operator.

18. In a pendulum scale, in combination with the pendulum thereof, a removable weight arranged to coöperate with the pendulum, and mechanism for placing such weight on the pendulum and removing it therefrom comprising a rock arm arranged at one side of the plane of oscillation of the pendulum and in the path of the removable weight, an indicator for indicating whether such weight is on or off the pendulum, and means common to both the arm and the indicator for operating them.

19. In a pendulum scale, in combination with the pendulum thereof, a removable weight arranged to coöperate with the pendulum, and mechanism for placing such weight on the pendulum and removing it therefrom comprising a rock arm arranged at one side of the plane of oscillation of the pendulum and in the path of the removable weight, an indicator for indicating whether such weight is on or off the pendulum, and a cam common to both the arm and the indicator for operating them.

20. In a pendulum scale, in combination with the pendulum thereof, a removable weight arranged to coöperate with the pendulum, and mechanism for placing such weight on the pendulum and removing it therefrom comprising a rock arm arranged at one side of the plane of oscillation of the pendulum and in the path of the removable weight, an indicator for indicating whether such weight is on or off the pendulum comprising a vertically movable plate having a depending strip, and a cam which is common to both the plate and the arm for operating them and on which the lower end of such strip rests.

21. In a pendulum scale, in combination with the pendulum thereof, a removable weight arranged to coöperate with the pendulum, and mechanism for placing such weight on the pendulum and removing it therefrom comprising a rock arm arranged at one side of the plane of oscillation of the pendulum and in the path of the removable weight, an indicator for indicating whether such weight is on or off the pendulum, a pendulum restoring device, and a cam common to the arm, indicator and pendulum restoring device for operating them.

22. In a pendulum scale, in combination with the pendulum thereof, a removable weight arranged to coöperate with the pendulum, and mechanism for placing such weight on the pendulum and removing it therefrom comprising a rock arm arranged at one side of the plane of oscillation of the pendulum and in the path of the removable weight, a pendulum restoring device consisting of a pivoted arm arranged to be moved in the path of the pendulum, a bell crank operatively connected with said pivoted arm, and a cam common to said bell crank and rock arm for operating them.

23. In a pendulum scale, in combination with the pendulum thereof, a removable weight arranged to coöperate with the pendulum, and mechanism for placing such weight on the pendulum and removing it therefrom comprising a rock arm arranged at one side of the plane of oscillation of the pendulum and in the path of the removable weight, a pendulum restoring device consisting of a pivoted arm arranged to be moved in the path of the pendulum, a bell crank operatively connected with said pivoted arm, and a segmental cam coöperating with said bell crank and arranged to impart an initial rapid movement to such bell crank and a slow subsequent movement.

24. In apparatus of the character described, a pendulum having a permanent weight, and a removable weight, with provisions for fixedly supporting the latter on the permanent weight in horizontal axial alinement therewith.

25. In apparatus of the character described, the combination with a pendulum and its permanent weight, of a removable weight therefor having enlarged end portions and a central portion reduced on all sides with provisions for supporting said removable weight on the permanent pendulum weight.

26. In apparatus of the character described, a pendulum having a permanent weight, and a removable weight comprising enlarged end portions and a reduced central portion, with provisions for supporting the latter on the permanent weight in horizontal axial alinement therewith.

27. In apparatus of the character described, a pendulum having a permanent weight, a removable weight, with provisions for supporting the latter on the permanent weight in horizontal axial alinement therewith and means for depositing said removable weight upon and removing it from the permanent weight.

28. In apparatus of the character described, a pendulum having a permanent weight, a removable weight comprising enlarged end portions and a reduced central portion, with provisions for supporting the latter on the permanent weight in horizontal axial alinement therewith and means for depositing said removable weight upon and removing it from the permanent weight.

29. In apparatus of the character described, the combination of a pendulum, a removable weight therefor, a weight-removing device, an indicator for showing whether the weight is on or off the pendulum, a pendulum restorer, and a cam for operating the latter, the indicator and the weight-removing device.

NIELS M. HANSEN.

Witnesses:
ALLEN DE VILBISS, Jr.,
M. L. THOMPSON.